United States Patent
Heirich et al.

(10) Patent No.: US 6,594,147 B2
(45) Date of Patent: Jul. 15, 2003

(54) THERMAL MANAGEMENT SYSTEM

(75) Inventors: Douglas L. Heirich, Palo Alto, CA (US); David A. Lundgren, Mill Valley, CA (US); Robert N. Olson, Mountain View, CA (US); Girish Upadhya, San Jose, CA (US); Larry Forsblad, Los Altos, CA (US); Daniel J. Riccio, Los Gatos, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/996,862

(22) Filed: Nov. 27, 2001

(65) Prior Publication Data

US 2002/0053419 A1 May 9, 2002

Related U.S. Application Data

(63) Continuation of application No. 09/411,062, filed on Oct. 4, 1999.

(51) Int. Cl.[7] .............................................. G02F 1/1333
(52) U.S. Cl. ....................... 361/687; 361/683; 361/686; 361/799; 364/708.1; 165/80.2
(58) Field of Search ........................ 361/683, 685–687, 361/699, 702–710, 712–721, 727, 692–697, 800, 802–804, 809, 752; 174/16.3, 252, 253, 16.1, 35 R; 165/80.2, 80.3, 80.4, 185; 307/150; 363/141, 144–145; 220/4.26, 4.02; 206/511, 512, 509, 557; 257/702–727, 686, 797; 364/708.01

(56) References Cited

U.S. PATENT DOCUMENTS

| | | | |
|---|---|---|---|
| 3,407,869 A | | 10/1968 | Staunton |
| 4,241,380 A | | 12/1980 | Lehmann et al. |
| 4,519,016 A | | 5/1985 | Bradley et al. |
| 4,850,657 A | | 7/1989 | Placke et al. |
| 5,237,486 A | * | 8/1993 | LaPointe et al. ............ 361/681 |
| 5,243,493 A | * | 9/1993 | Jeng et al. .................. 361/690 |
| 5,297,025 A | | 3/1994 | Shoquist et al. |
| 5,313,362 A | * | 5/1994 | Hatada et al. ............... 361/709 |
| 5,557,500 A | | 9/1996 | Baucom et al. |
| 5,559,675 A | | 9/1996 | Hsieh et al. |
| 5,600,538 A | * | 2/1997 | Xanthopoulos .............. 361/683 |
| 5,671,120 A | * | 9/1997 | Kikinisi ....................... 361/687 |
| 5,677,830 A | | 10/1997 | Nogas et al. |
| 5,726,864 A | | 3/1998 | Copeland et al. |
| 5,751,550 A | * | 5/1998 | Korinsky .................... 361/695 |
| 5,774,330 A | | 6/1998 | Melton et al. |
| 5,784,256 A | | 7/1998 | Nakamura et al. |
| 5,812,373 A | | 9/1998 | Hwang |
| 5,816,673 A | | 10/1998 | Sauer et al. |
| 5,835,343 A | | 11/1998 | Johns et al. |
| 5,870,485 A | | 2/1999 | Lundgren et al. |
| 5,923,531 A | | 7/1999 | Bachman et al. |
| 5,973,920 A | | 10/1999 | Altic et al. |
| 6,008,986 A | * | 12/1999 | Mok .......................... 361/687 |
| 6,015,195 A | * | 1/2000 | Anderson et al. ......... 312/223.2 |
| 6,049,455 A | | 4/2000 | Nakamura et al. |
| 6,101,089 A | | 8/2000 | Seto et al. |
| 6,104,451 A | | 8/2000 | Matsuoka et al. |
| 6,115,249 A | * | 9/2000 | Cipolla et al. .............. 361/687 |

OTHER PUBLICATIONS

Article "Personal Computer Structure Designed for Robotized Manufacturability", IBM Technical Disclosure Bulletin, Aug. 1987, US, vol. 30, Issue 3, pp. 1253–1255.*

* cited by examiner

*Primary Examiner*—Michael Datskovskiy
(74) *Attorney, Agent, or Firm*—Blakely, Sokoloff, Taylor & Zafman LLP

(57) ABSTRACT

An apparatus for removing heat from heat generating elements is disclosed. The apparatus is a thermal management system having a thermal distribution assembly in either one of or both of conductive and radiative communication with heat generating elements. The thermal distribution assembly has thermal zones, each of which is associated with at least one heat generating element. The thermal distribution assembly includes a heat spreading frame and a heat conducting frame. Heat passes from the heat generating elements to the heat conducting frame and then to the heat spreading frame, from which the heat is removed via convection.

3 Claims, 8 Drawing Sheets

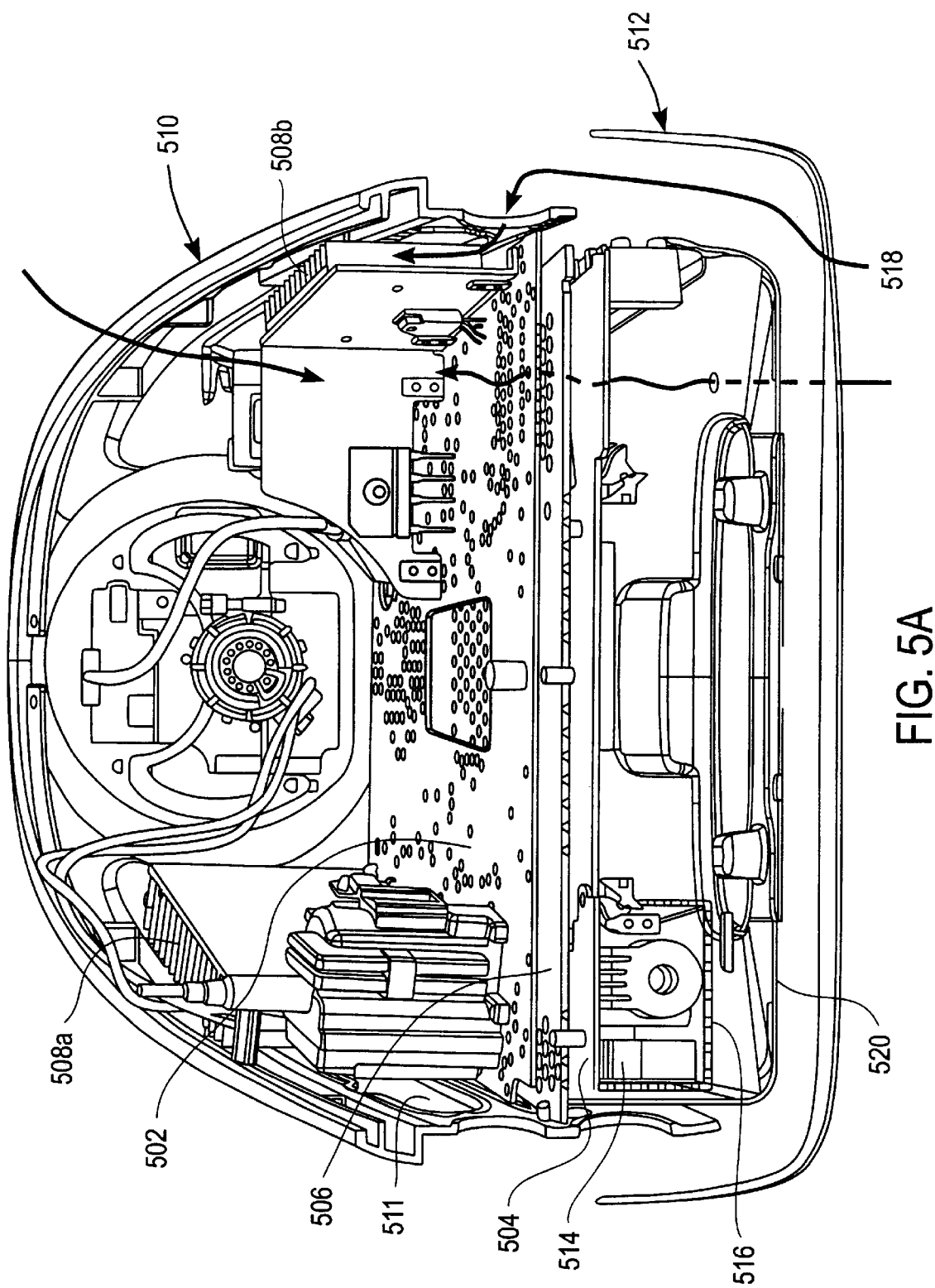

THERMAL MANAGEMENT SYSTEM

This application is a continuation application of U.S. patent application Ser. No. 09/411,062, filed Oct. 4, 1999.

BACKGROUND OF THE INVENTION

1. Field of the Invention

The present invention relates generally to heat removal devices, and more specifically to heat removal devices for electronic components.

2. Background Information

Electronic components are capable of generating undesirable levels of heat during normal use. For example, in some personal computers, the microprocessor can generate enough heat to damage the microprocessor if at least some of the heat is not removed from the microprocessor. Furthermore, personal computers and other electronic systems often have a number of heat producing components which are located in an enclosed area and are in close proximity to one another. The total heat generated by such situated heat producing components can reach high enough levels to damage the entire system if the heat is not dissipated within the enclosed area or removed from the components.

Many existing heat removal devices attempt to remove heat from electronic components using forced convection. A common example of a forced convection device is a fan. Some electronic systems use one large fan to cool all of the heat producing components within the system. Other electronic systems have individual fans for each heat producing component. Still other electronic systems have both one main fan and individual component fans. However, fans can be problematic because they often generate unacceptable levels of noise and require their own power to run. In addition, because fans incorporate moving parts, they are susceptible to mechanical failure. By the time a defective fan is detected, the previously cooled component could have already overheated and been damaged.

Other existing heat removal systems attempt to remove heat from electronic components using natural convection. Conventionally, this is effected by directly attaching the sources of heat generation to heat sinks. However, these heat sinks are of necessity large relative to the heat sources, and their size places undesirable constraints upon the design of a product with high heat generation density.

Thus, to help ensure the continuing safe performance of heat generating electronic components, it is desirable to remove heat from such components in a quiet, efficient and reliable manner. Particularly, it is desirable to effect high density and efficient heat removal through multi-purpose components incorporated into a unified thermal management system.

SUMMARY OF THE INVENTION

The present invention provides a thermal management system for distributing and removing heat from heat generating elements. The system also provides functionality for structural support and EMI suppression, thereby providing a more efficient, compact and cost effective design.

In one embodiment of the present invention, the thermal management system has a thermal distribution assembly which is in conductive and/or radiative communication with heat generating elements. The thermal distribution assembly has thermal zones, each of which is associated with at least one heat generating element.

In another embodiment of the present invention, the thermal distribution assembly includes a heat spreading frame and a heat conducting frame in conductive contact with the heat spreading frame. The heat conducting frame removes heat from heat generating elements via conduction and/or radiation, and the heat passes to the heat spreading frame. Natural convection then removes the heat from the heat spreading frame.

In another embodiment of the present invention, the thermal management system also includes a main body which houses the heat generating elements. The main body has an inlet and an outlet to facilitate the convective flow of air through the main body such that the heat generating elements are sufficiently cooled.

Additional features and benefits of the present invention will become apparent upon review of the following description.

BRIEF DESCRIPTION OF THE DRAWINGS

Various embodiments of the present invention will be described in detail with reference to the following drawings in which like reference numerals refer to like elements. The present invention is illustrated by way of example and not limitation in the accompanying figures.

FIG. 5A shows a front and top cut-away view of a housing to show a thermal management system in accordance with the teachings of the present invention.

DETAILED DESCRIPTION

The following description provides embodiments of the present invention. However, it will be appreciated that other embodiments of the present invention will become apparent to those of ordinary skill in the art upon examination of this description. Thus, the present description and accompanying drawings are for purposes of illustration and are not to be used to construe the invention in a restrictive manner.

Figure 1:
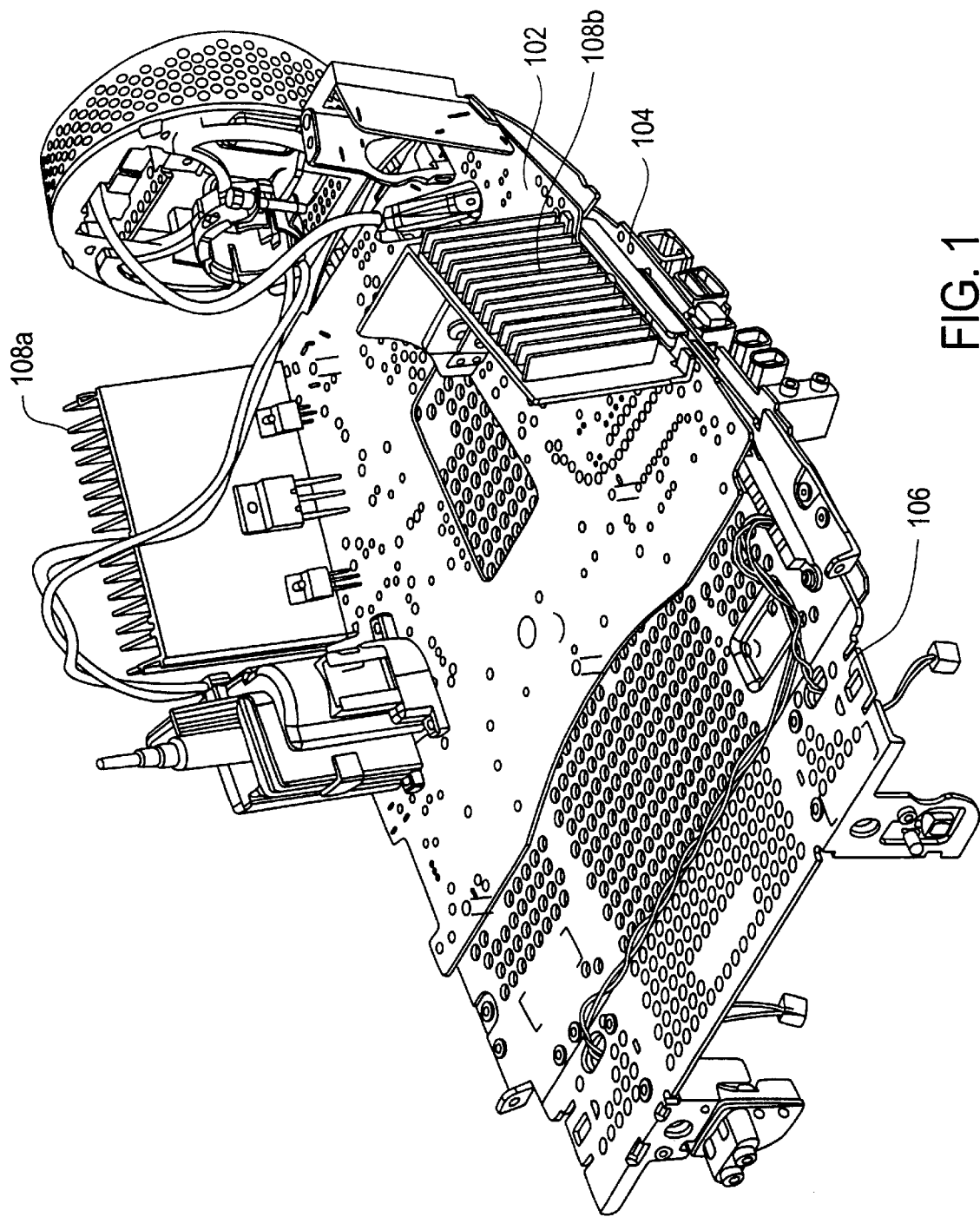
FIG. 1 shows one part of a thermal distribution assembly in accordance with the teachings of the present invention.
Figure 2:
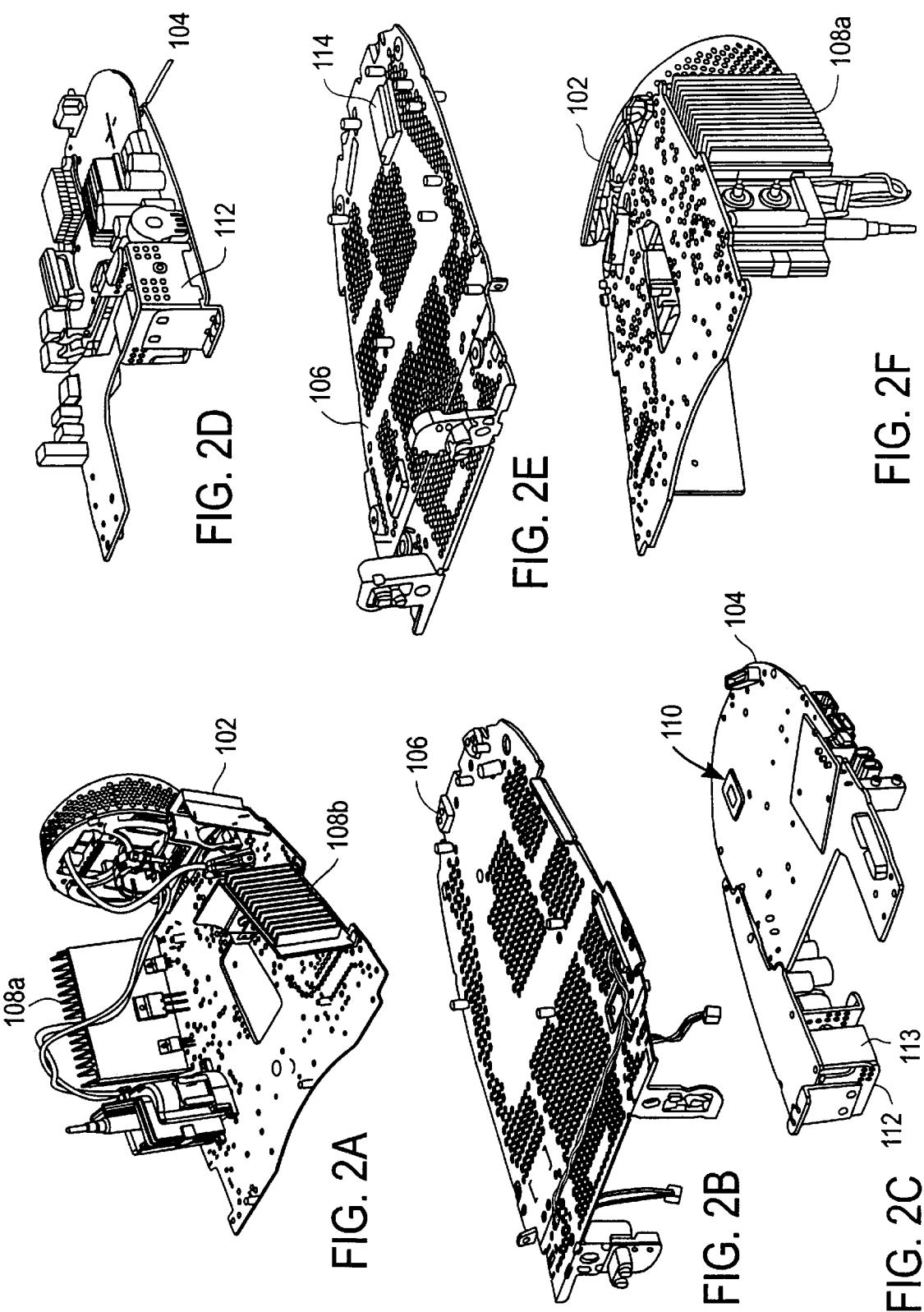
FIGS. 2A–2C show a top angled exploded view of the part of the thermal distribution assembly shown in FIG. 1.
FIGS. 2D–2F show an upside down exploded view of the part of the thermal distribution assembly shown in FIG. 1.

FIG. 1 illustrates one part of a thermal distribution assembly in accordance with the teachings of the present invention. A printed circuit board 102 is coupled to one side of a heat conducting frame 106. Another printed circuit board 104 is coupled to the other side of heat conducting frame 106. Typically, printed circuit boards 102 and 104 each have heat producing elements attached to them (see FIGS. 2C and 2D, for example). The heat producing elements can be microprocessors, power supplies or any other commonly known heat producing elements. Heat sinks 108*a* and 108*b* are coupled to and in conductive communication with heat producing elements on printed circuit board 102. Heat sinks 108a and 108b help dissipate heat generated by any heat producing components on printed circuit board 102 which might heat up printed circuit boards 102 and 104.

In one embodiment of the present invention, not all of the components are in physical contact with heat conducting frame 106; such components can radiate heat to heat conducting frame 106. The heat producing components on circuit boards 102 and 104 that are in physical contact with heat conducting frame 106 conduct heat to heat conducting frame 106; such components can also radiate heat to heat conducting frame 106. It is appreciated that heat conducting frame 106 can be any suitable conductive material, such as metal. Furthermore, although two circuit boards are shown, it is appreciated that the present invention i& also applicable to electronic systems with only one circuit board.

The following discussion is made with reference to FIGS. 2A–2F, which show two exploded views of the portion of the thermal distribution assembly shown in FIG. 1. A microprocessor 110 is attached to one side of printed circuit board 104. A power supply 113 is attached to the other side of printed circuit board 104. A local heat conducting frame 112 coupled to board 104 is disposed around and in conductive communication with power supply 113. Local heat conducting frame 112 has its own thermal zone because much of its surface area is in physical contact with power supply 113, which is generating heat that is transferred to frame 112. Because much of the heat generated by power supply 113 is conducted directly to frame 112, a localized temperature can exist at frame 112. Similarly, the area of frame 106 around microprocessor 110 can be considered to have its own thermal zone with a particular localized temperature.

In one embodiment of the present invention, frame 112 is in conductive communication with frame 106 to help remove the heat generated by power supply 113. Some of the heat generated by microprocessor 110 is removed via conduction by a heat sink 114, which is in direct physical contact with microprocessor 110 when circuit board 104 is coupled to frame 106. Heat sink 114 is typically coupled to frame 106. Alternatively, heat sink 114 is integrally formed with frame 106. Heat sink 114 may be formed of a composite of materials to offer a desirable mixture of thermal conductivity and mechanical compliance. In any case, heat sink 114 helps to spread the heat generated by microprocessor 110 to frame 106.

Figure 3:
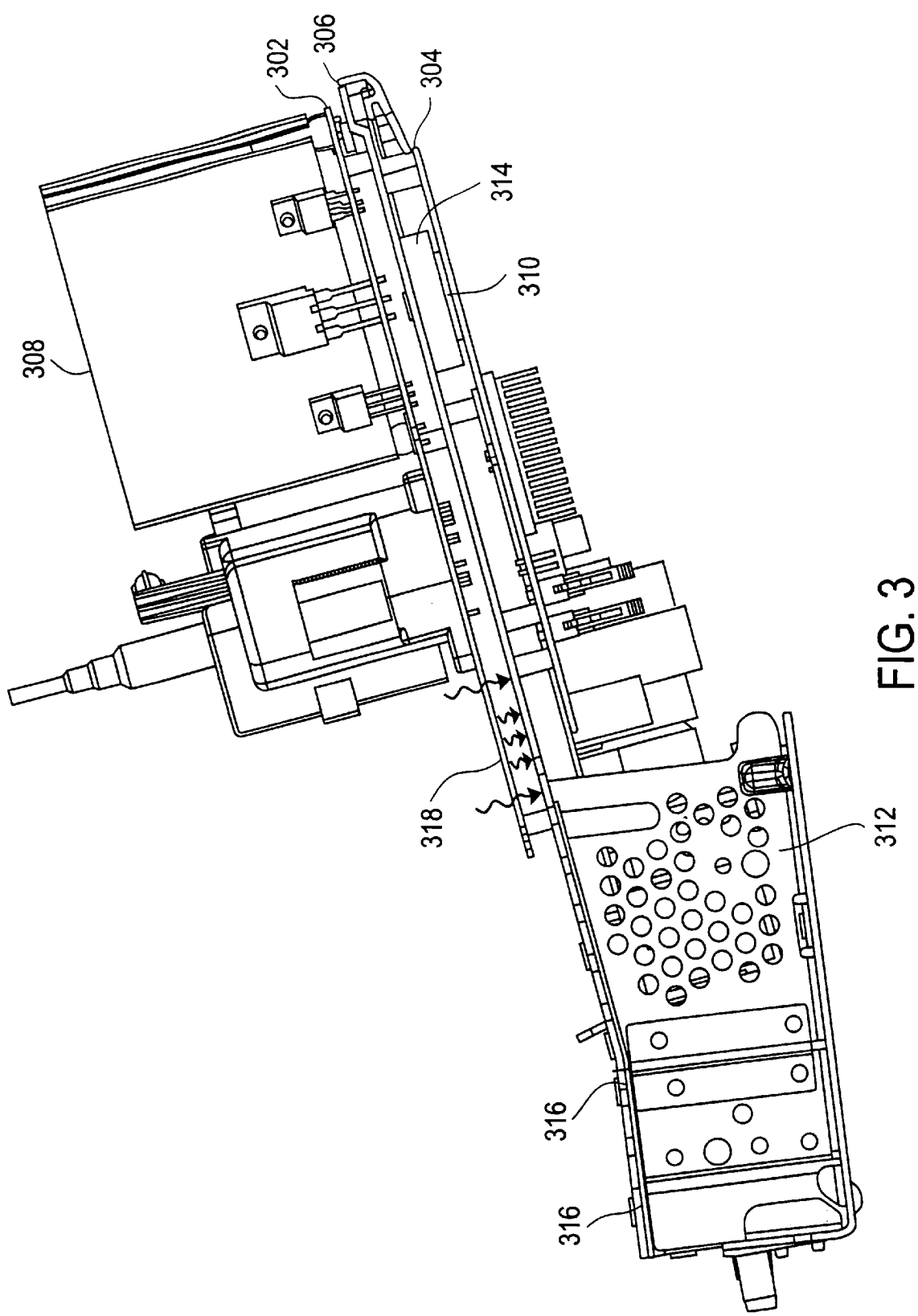
FIG. 3 shows a side cross-sectional view of another embodiment of a part of a thermal distribution assembly in accordance with the teachings of the present invention.

FIG. 3 shows a side cross-sectional view of a part of a thermal distribution assembly similar to that which is shown in FIG. 1. A printed circuit board 302 is coupled to one side of a conductive divider 306. A printed circuit board 304 is coupled to the other side of conductive divider 306. Heat sink 308 is coupled to and in conductive communication with board 302 to help remove heat from board 302. A microprocessor 310 is coupled to board 304. Microprocessor 310 is in direct physical contact with a local heat spreader 314, similar to heat sink 114, which is attached to or integrally formed with conductive divider 306. Heat spreader 314 is made of a conductive material or a composite of materials to offer a desirable mixture of thermal conductivity and mechanical compliance. Thus, microprocessor 310 is in conductive communication with conductive divider 306.

A local heat conducting frame 312 is thermally isolated from conductive divider 306 by insulative material 316. In one embodiment, local heat conducting frame 312 houses and is in conductive communication with a heat generating component such as a DVD drive, CD drive, hard drive or other storage media. Thus, frame 312 can act as a heat distributor and heat sink to facilitate convective heat transfer. In one embodiment of the present invention, heat generating components on boards 302 and 304 radiate heat to conductive divider 306 as shown in area 318 on board 302.

Figure 4A:
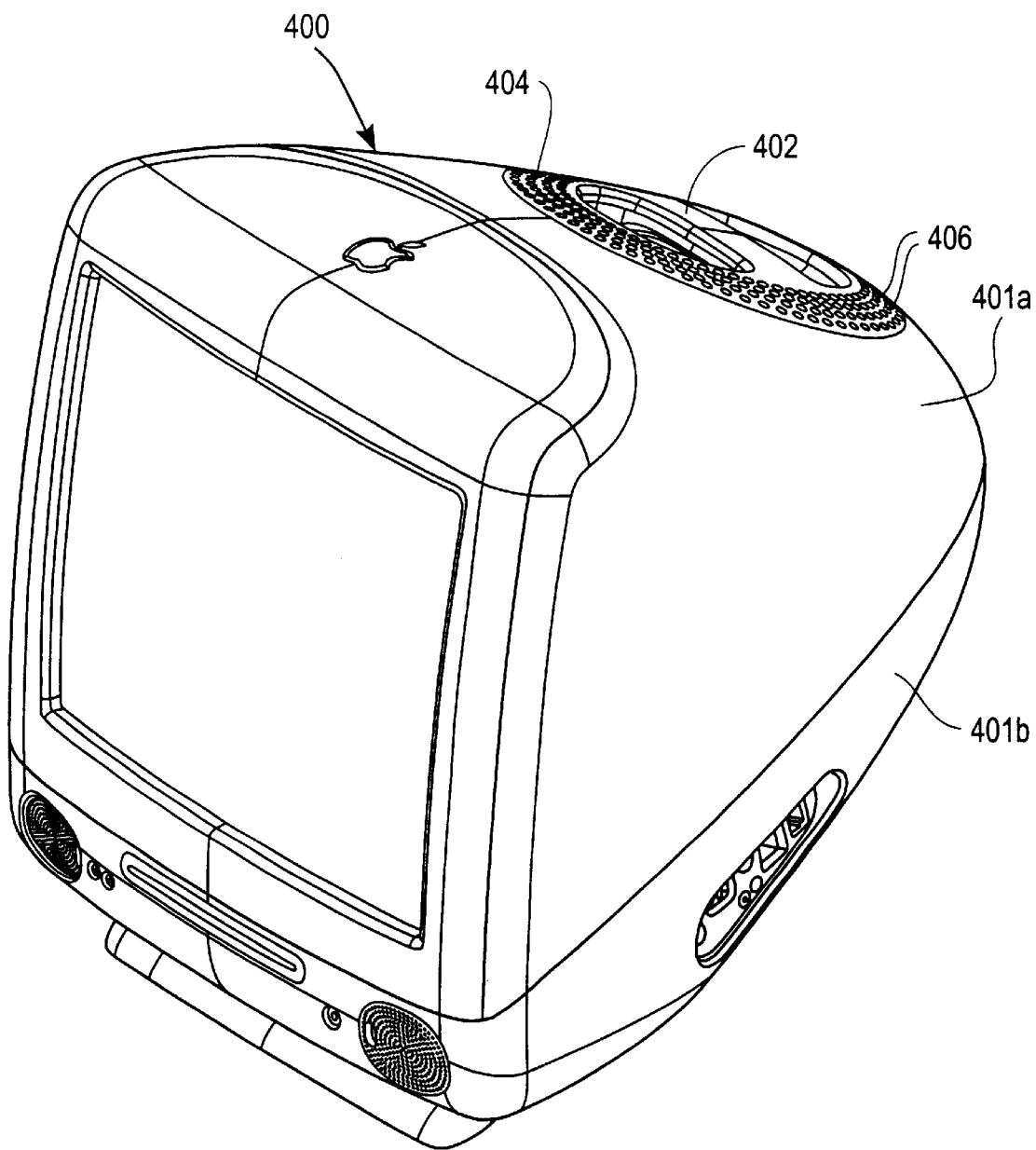
FIG. 4A shows a front angled view of a housing in accordance with the teachings of the present invention.
Figure 4B:
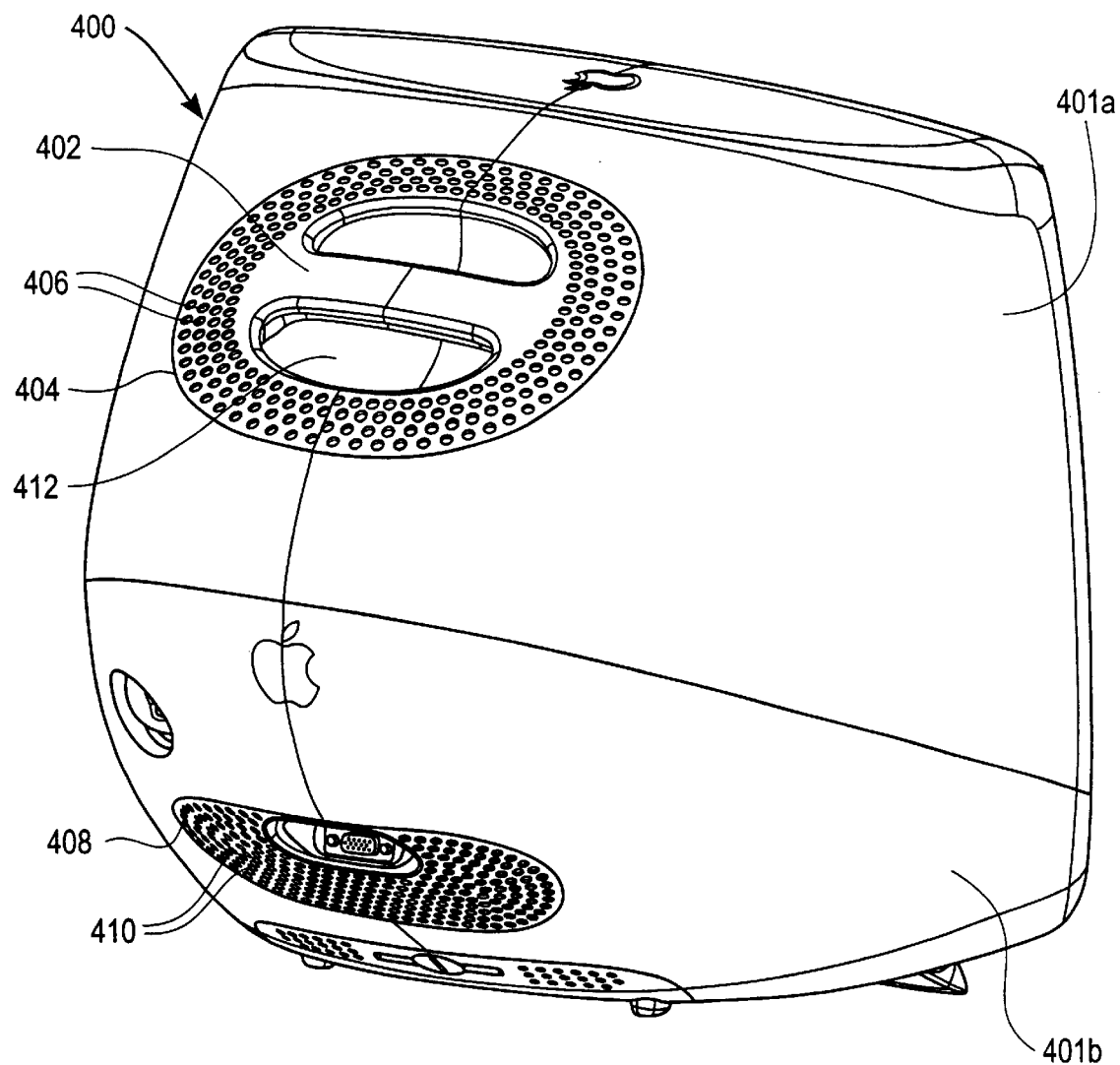
FIG. 4B shows a rear angled view of the housing shown in FIG. 4A.

FIGS. 4A and 4B illustrate front and rear angled views, respectively, of a housing 400 in accordance with the teachings of the present invention. Housing 400 encloses a number of heat generating components (not shown) which form an electronic system. Housing 400 has a top portion 401a and a bottom portion 401b. In one embodiment, top portion 401a and bottom portion 401b are separate pieces of housing 400 which are fitted together to form housing 400. A handle 402 is formed in top portion 401a of housing 400 to allow a person to pick up housing 400. A circular outlet vent 404 is formed in top portion 401a around handle 402. In one embodiment, outlet vent 404 and handle 402 are integrally formed with each other to constitute a separate piece which is coupled to top portion 401a. A plurality of holes 406 is formed in outlet vent 404 to facilitate the escape of heat generated by heat generating components located inside housing 400.

A concavity 412 is formed in housing 400 to allow a person to place his or her fingers around handle 402 and comfortably grasp handle 402. Concavity 412 also serves to deflect air flow from within housing 400 toward outlet vent 404. An inlet vent 408 is formed in bottom portion 401b of housing 400. A plurality of holes 410 is formed in inlet vent 408 to facilitate a convective air path from inlet vent 408 through the inside of housing 400 to outlet vent 404. In a preferred embodiment of the present invention, natural convection provides the flow of air from inlet vent 408 through the inside of housing 400 to outlet vent 404. However, it is appreciated that the present invention can be used in conjunction with a fan or other cooling device that provides forced convection.

Figure 5B:
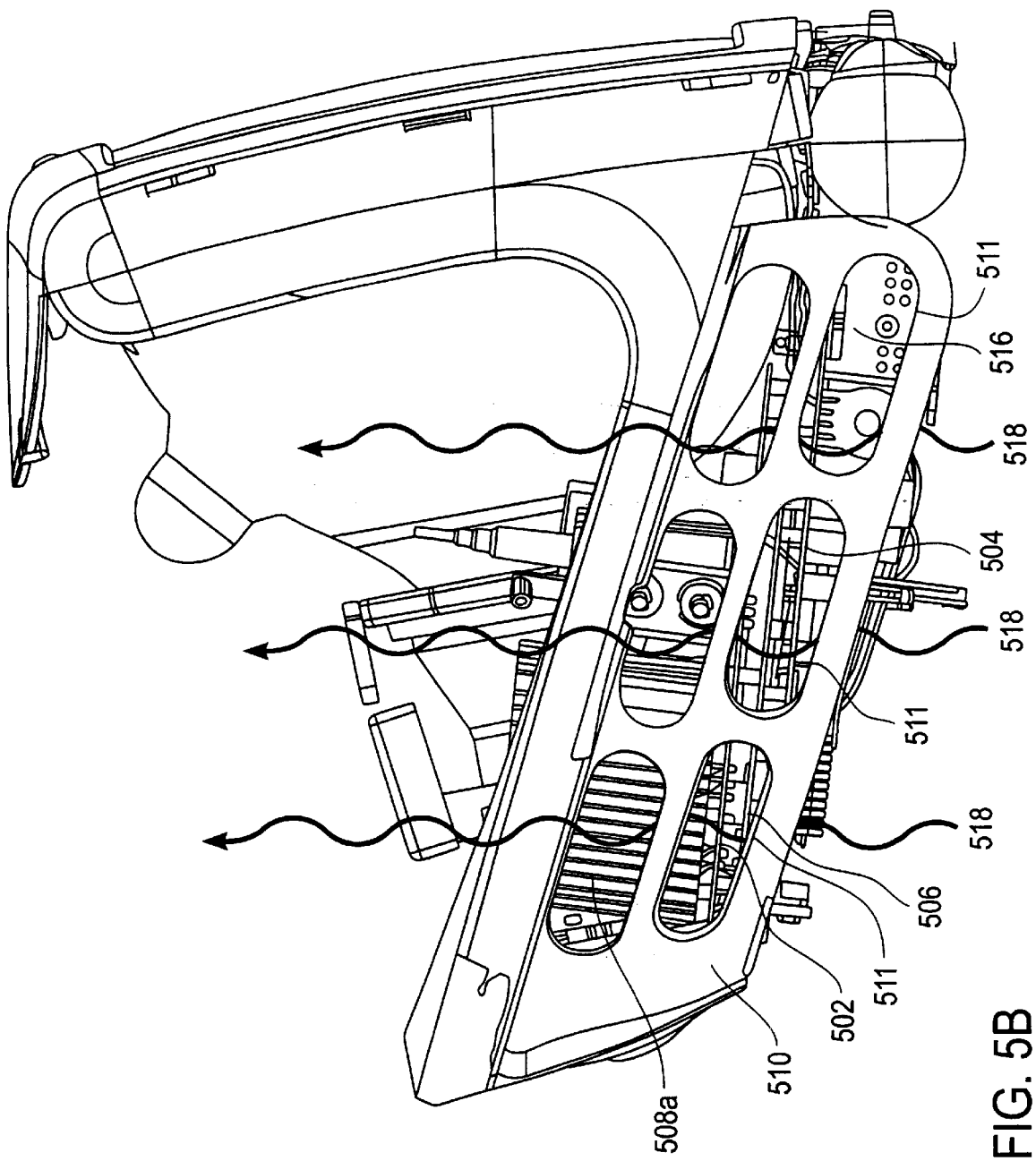
FIG. 5B shows a side cut-away view of the housing shown in FIG. 5A.

FIGS. 5A and 5B illustrate a front and top cut-away view and a side cut-away view, respectively, of a housing similar to that shown in FIGS. 4A and 4B. A thermal management system according to the present invention is shown within the housing. A printed circuit board 502 is coupled to the top of a heat conducting divider 506. A printed circuit board 504 is coupled to the bottom of heat conducting divider 506. Heat sinks 508a and 508b are coupled to board 502 to help remove heat from board 502. A heat spreading frame 510 is coupled to and in conductive communication with divider 506. Heat spreading frame 510 is disposed around the sides and rear of boards 502, 504 and 506. A plurality of air vents 511 is formed in frame 510. Air vents 511 can be formed at regular intervals in frame 510 or in any pattern that facilitates air flow around frame 510 and within the spaces between frame 510 and the components and heat sinks adjacent to frame 510. In one embodiment, frame 510 is made of plastic. In another embodiment, frame 510 helps form a housing, including lower housing 512, to fully enclose the components of a computer system. Frame 510 can be one continuous piece or several pieces coupled together.

A power supply 514 is coupled to board 504. A local heat conducting frame 516 is disposed around and in conductive communication with power supply 514. An EMI shield 520 further encloses power supply 514 and frame 516. In one embodiment, frame 516 is coupled to board 504 and in conductive communication with divider 506. In a preferred embodiment of the invention, divider 506 in combination with frame 516 and frame 510 provide structural support for the system. A convective air flow 518 from inlet vents (not shown) in the bottom of a lower housing 512 help remove heat from heat generating components, such as power supply 514, frames 502, 504, 506 and 510, and heat sinks 508*a* and 508*b*. It should be noted that heat sinks 508*a* and 508*b* and heat producing elements such as power supply 514 are located near the periphery of the housing to facilitate heat removal by being closer to air flow 518 flowing up, around and through frame 510. It should be further noted that air flow 518 follows a generally upward path because air flow 518 gradually acquires heat from the heat sources located within the housing.

Figure 6:
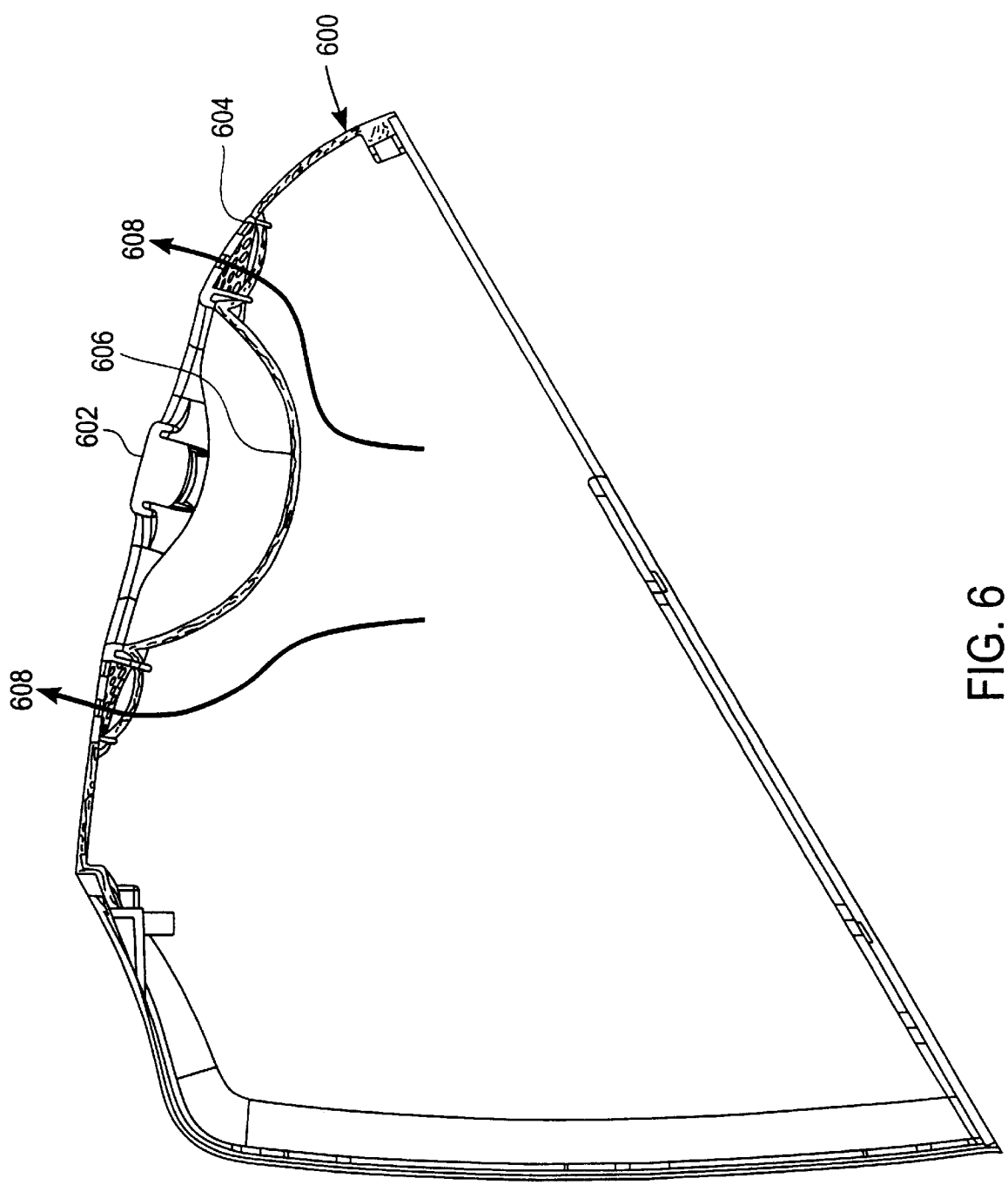
FIG. 6 shows a side cross-sectional view of a top portion of a housing in accordance with the teachings of the present invention.

FIG. 6 illustrates a side cross-sectional view of a top housing 600 that can be used with the embodiments of the present invention shown in FIGS. 4A, 4B or 5. An outlet vent 604 is formed in top housing 600. In one embodiment, outlet vent 604 comprises a plurality of holes which permit the escape of air from within top housing 600. Outlet vent 604 surrounds a handle 602 formed in top housing 600 in a manner similar to that shown in FIGS. 4A and 4B. In one embodiment, outlet vent 604 is integrally formed with handle 602 to form a piece separate from top housing 600; the piece is secured to top housing 600 in a manner suitable to allow a person to use handle 602. A concavity 606 is formed in top housing 600 below handle 602 to allow a person to place his or her fingers around handle 602 and comfortably grasp handle 602. Concavity 606 also serves to direct a convective air flow 608 from within top housing 600 toward outlet vent 604. By deflecting air flow 608, which is typically heated, toward outlet vent 604, concavity 606 facilitates the removal of heated air via outlet vent 604 and prevents heated air from heating handle 602 to uncomfortably high temperatures.

In the foregoing detailed description, the apparatus and method of the present invention have been described with reference to specific exemplary embodiments. However, it will be evident that various modifications and changes may be made without departing from the broader scope and spirit of the present invention. The present specification and figures are accordingly to be regarded as illustrative rather than restrictive.

What is claimed is:

1. A method to cool a computer system comprising:

directing at least part of heat generated from a heat-producing element to a heat-conducting frame; and transferring at least part of the heat away from the heat-conducting frame and vertically disposed fins by natural convection through an inlet disposed on a bottom surface of a housing and an outlet disposed on a top surface of the housing and wherein the heat within the computer system is not removed by forced convection;

wherein the heat-conducting frame is contained within the housing and wherein a flow of air enters the housing through the inlet and exits the housing through the outlet.

2. A method to cool a computer system comprising:

directing at least part of heat generated from a heat-producing element to a heat-conducting frame; and transferring at least part of the heat away from the heat-conducting frame and vertically disposed fins by natural convection through an inlet disposed on a bottom surface of a housing and an outlet disposed on a top surface of the housing and wherein the heat within the computer system is not removed by forced convection, wherein the directing includes allowing at least part of the heat to be naturally convected between the heat-producing element and the heat-conducting frame and wherein said outlet is disposed adjacent a handle on the top surface and wherein air flow is directed away from said handle and toward said outlet.

3. The method of claim 1, wherein a flow of air enters the housing through the inlet and exits the housing through the outlet.

\* \* \* \* \*